April 3, 1934.  F. H. HEINTZ  1,953,712
COIL
Filed Aug. 30, 1933   2 Sheets-Sheet 1

Inventor
Frederick H. Heintz,
By Clarence A. O'Brien
Attorney

April 3, 1934. F. H. HEINTZ 1,953,712
COIL
Filed Aug. 30, 1933 2 Sheets-Sheet 2

Inventor
Frederick H. Heintz,

By Clarence A. O'Brien
Attorney

Patented Apr. 3, 1934

1,953,712

UNITED STATES PATENT OFFICE 1,953,712

COIL

Frederick Harry Heintz, Blue Island, Ill.

Application August 30, 1933, Serial No. 687,492

4 Claims. (Cl. 175—359)

This invention appertains to new and useful improvements in electrical coils, and the principal object of the present invention is to provide a coil which will regulate the output of current in a steady and uniform manner.

During the course of the following specification, other important objects and advantages of the invention will become apparent to the reader.

In the drawings:—

Figure 1:
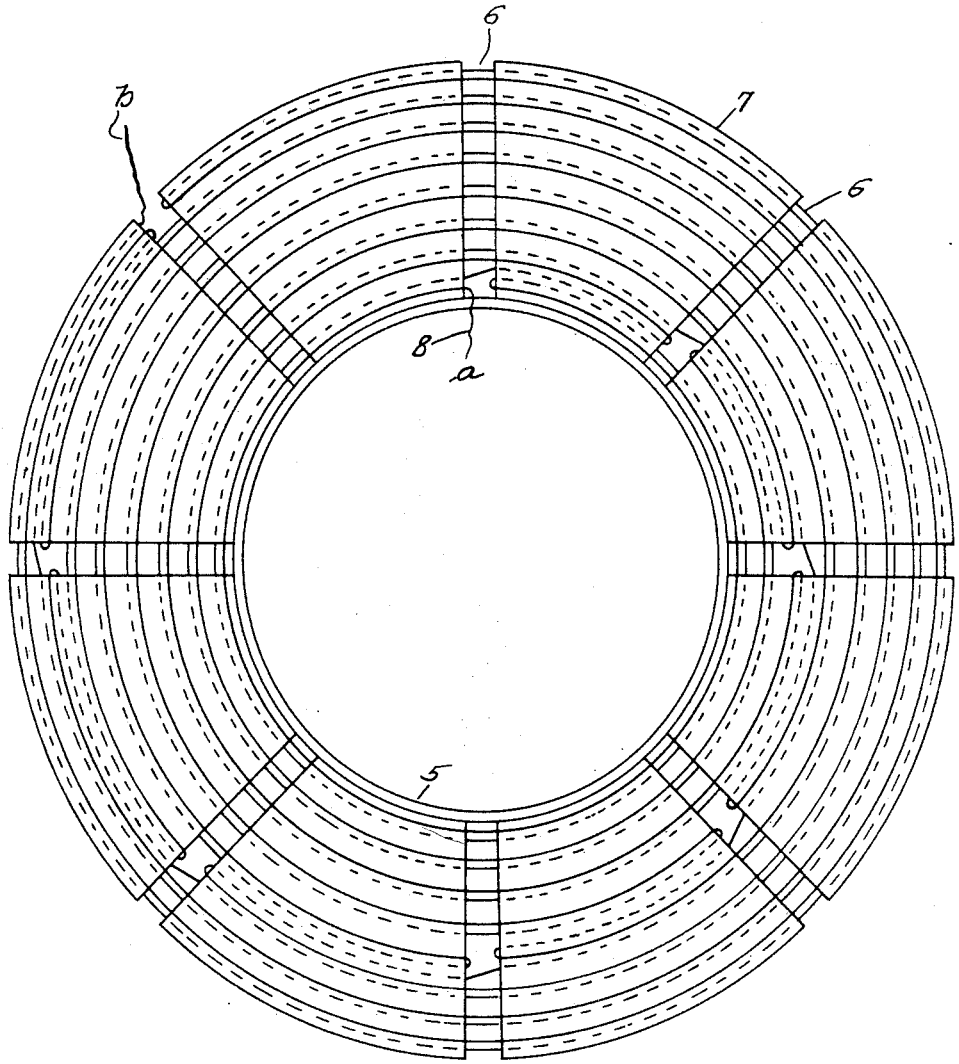
Figure 1 represents a side elevational view of the frame of the coil, with the wiring shown diagrammatically thereon.
Figure 2:
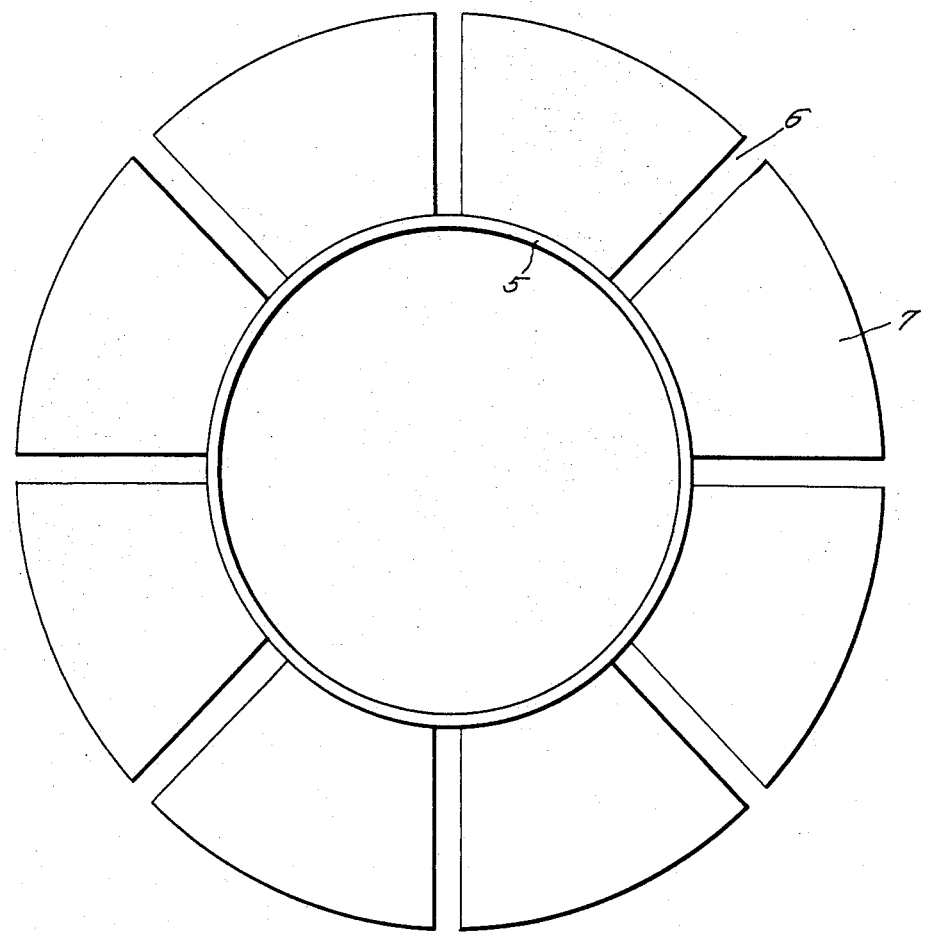
Figure 2 represents a side elevational view of the frame of the coil, with the wiring removed.
Figure 3:
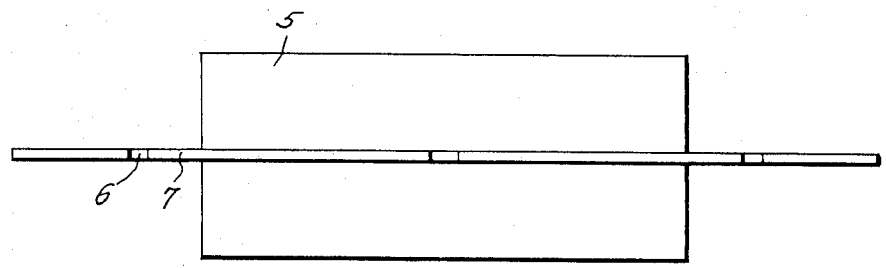
Figure 3 represents an edge elevational view of the coil frame, with the wiring removed.

As is clearly shown in Figures 2 and 3, this coil may include a tubular core 5 having at its intermediate point a circumferentially disposed flange which is provided with radially disposed slots 6 at equal spaced intervals to define segments 7. In winding the coil shown in Figure 1, take for instance, the wire 8 starting at $a$. The wire is disposed on one side of the flange and wound on the core 5 until it returns to the same slot 6, where it passes through the slot and starts back in the opposite direction to the next slot toward the right and then comes through this slot 6 last mentioned and turns backwardly and makes another revolution to return to the slot 6 through which it last passed. The wire is then inserted through this last mentioned slot and is disposed backwardly to the next slot on the right, and through this last mentioned slot and back across the opposite side of this particular segment. This winding operation of the wire is repeated until the end $b$ is reached.

Figure 1 is a diagrammatic view, the wiring not being necessarily concentric with respect to the core 5, as shown.

A coil's polarity depends on the direction of the flow of current. A regular circular coil of wire wound in one direction; has one side, of one pole, while the other side is of opposite polarity. The lines of force are uniformly distributed about the center of the coil except for the space where the ends of the coil have left a space free of lines of force. To overcome this, the gaps are distributed about the coil so as to make the lines of force of equal intensity all around the center of the coil.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

1. A coil comprising a core, a circumferentially extending flange on the core, a coil wound around the core and against the flange, with its convolutions each disposed in the same direction, and each convolution ending in a loop around succeeding segments of the flange.

2. An electric coil comprising a plurality of convolutions, each convolution having a reversely wound relatively small loop therein.

3. An electric coil comprising a plurality of convolutions, each convolution having a reversely wound relatively small loop therein, said loops in successive convolutions being progressively arranged around the coil.

4. An electric coil comprising a plurality of convolutions and a relatively small loop at the completion of certain of said convolutions.

FREDERICK HARRY HEINTZ.